(12) United States Patent
Wang et al.

(10) Patent No.: US 9,994,470 B2
(45) Date of Patent: *Jun. 12, 2018

(54) METHOD OF REMOVING RECALCITRANT ORGANIC POLLUTANTS

(75) Inventors: Sijing Wang, Shanghai (CN);
Zhonghong Cheng, Shanghai (CN);
Weiqing Xu, Shanghai (CN)

(73) Assignee: General Electric Company, Schenectady, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 14/003,667

(22) PCT Filed: Mar. 7, 2011

(86) PCT No.: PCT/CN2011/000359
§ 371 (c)(1),
(2), (4) Date: Sep. 6, 2013

(87) PCT Pub. No.: WO2012/119266
PCT Pub. Date: Sep. 13, 2012

(65) Prior Publication Data
US 2013/0334135 A1     Dec. 19, 2013

(51) Int. Cl.
*C02F 3/00* (2006.01)
*C02F 3/10* (2006.01)
(Continued)

(52) U.S. Cl.
CPC ............... *C02F 3/348* (2013.01); *C02F 3/06* (2013.01); *C02F 3/106* (2013.01); *C02F 3/34* (2013.01);
(Continued)

(58) Field of Classification Search
CPC .. C02F 3/348; C02F 3/06; C02F 3/106; C02F 3/34; C02F 1/281; C02F 1/283;
(Continued)

(56) References Cited

U.S. PATENT DOCUMENTS 5,126,050 A    6/1992   Irvine et al.
5,427,944 A    6/1995   Lee et al.
(Continued)

FOREIGN PATENT DOCUMENTS

CL    2014002690 A1    12/2014
CN       1594147 A      3/2005
(Continued)

OTHER PUBLICATIONS

European Search Report issued in connection with corresponding EP Application No. 11860393.5 dated Sep. 9, 2014.
(Continued)

*Primary Examiner* — Claire A Norris
(74) *Attorney, Agent, or Firm* — Wegman, Hessler & Vanderburg

(57) ABSTRACT

Recalcitrant chemical oxygen demand (COD) of a liquid is reduced in a water treatment system. The method includes pretreating the liquid in a pretreatment unit to remove indigenous bacteria or microbes to a population level below which the indigenous organisms can interfere with the screened and externally introduced microorganisms. The liquid is then provided to a reactor that has a filter bed formed with a carrier material. Special microbes are screened and used to colonize the carrier material to remove recalcitrant COD. A biofilm is cultured on the surface of the carrier material to immobilize the screened microbes in the reactor. The method further includes percolating the liquid from the pretreatment unit through the filter bed colonized with the screened microbes to degrade at least part of the recalcitrant COD under aerobic conditions. In one embodiment, the filter is formed with biological granular activated carbon (GAC) as the carrier material and the screened microbes comprise at least one microbial species selected from the group consisting of *Bacillus, Comamonas, Arthro-*
(Continued)

*bacter, Micrococcus, Pseudomonas, Pediococcus, Achromobacter, Flavobacterium, Mycobacterium, Rhodanobacter, Stenotrophomonas* and Yeast.

11 Claims, 1 Drawing Sheet

(51) Int. Cl.
*C02F 3/34* (2006.01)
*C02F 3/06* (2006.01)
*C02F 1/28* (2006.01)

(52) U.S. Cl.
CPC ............ *C02F 1/281* (2013.01); *C02F 1/283* (2013.01); *Y02W 10/15* (2015.05)

(58) Field of Classification Search
CPC ........ C02F 3/04; C02F 2209/08; C02F 3/104; C02F 3/1226; Y02W 10/15
USPC ................................. 210/601, 610, 616, 617
See application file for complete search history.

(56) References Cited

U.S. PATENT DOCUMENTS

| | | | |
|---|---|---|---|
| 5,514,278 | A | 5/1996 | Khudenko |
| 6,059,973 | A | 5/2000 | Hudson et al. |
| 6,107,067 | A | 8/2000 | Miller et al. |
| 6,159,363 | A | 12/2000 | Collins et al. |
| 6,159,364 | A | 12/2000 | Hirane |
| 6,472,198 | B1 * | 10/2002 | Semprini ............... B09C 1/002 210/601 |
| 6,610,204 | B1 | 8/2003 | Kroon et al. |
| 7,288,197 | B2 | 10/2007 | Shao et al. |
| 8,784,658 | B2 | 7/2014 | Hoyland |
| 2003/0155296 | A1 * | 8/2003 | Boyd ...................... C02F 3/006 210/610 |
| 2003/0190742 | A1 * | 10/2003 | Whiteman ................ C02F 3/12 435/262 |
| 2004/0140448 | A1 | 7/2004 | Wu Hsiao et al. |
| 2007/0178577 | A1 | 8/2007 | Candussio et al. |
| 2008/0242875 | A1 | 10/2008 | Hong et al. |
| 2009/0236282 | A1 * | 9/2009 | Wang ....................... B09B 3/00 210/610 |
| 2010/0264082 | A1 | 10/2010 | Conner |
| 2013/0264280 | A1 | 10/2013 | Zhao et al. |

FOREIGN PATENT DOCUMENTS

| | | |
|---|---|---|
| CN | 1718548 A | 1/2006 |
| CN | 1930298 A | 3/2007 |
| CN | 101045582 A | 10/2007 |
| CN | 101259983 A | 9/2008 |
| CN | 101264991 A | 9/2008 |
| CN | 101333042 A | 12/2008 |
| CN | 101977854 A | 2/2011 |
| CN | 102583781 A | 7/2012 |
| EP | 0812806 A1 | 12/1997 |
| EP | 1270513 A1 | 1/2003 |
| JP | 9-314156 A | 12/1997 |
| JP | 2007185596 A | 7/2007 |
| JP | 2008194023 A | 8/2008 |
| KR | 100638319 B1 | 10/2006 |
| TW | I284119 B | 7/2007 |
| TW | 200927677 A | 7/2009 |
| WO | 199414712 A1 | 7/1994 |
| WO | WO 2009/085252 A1 | 7/2009 |
| WO | 2012119266 A1 | 9/2012 |

OTHER PUBLICATIONS

International Search Report and Written Opinion dated Dec. 8, 2011 which was issued in connection with PCT Patent Application No. CN11/000359 which was filed on Mar. 7, 2011.
Unofficial English translation of Taiwan Office Action issued in connection with corresponding TW Application No. 101107742 dated Nov. 10, 2015.
Chinese Office Action issued in connection with corresponding CN Application No. 201180069051.4 dated Jul. 8, 2014.
Xuelian, "A Study on Trichloroethylene Degradation by Aerobic Cometabolism and Volatile Model", Environmental Engineering, pp. 71, 2006.
Shan et al., "Biodegradation of Malathion by Acinetobacter johnsoii MA19 and Optimization of Cometabolism Substrates", Journal of Environmental Sciences, vol. No. 21, Issue No. 01, pp. 76-82, 2009.
Yingzi et al., "The Action Research of Co-Substrate Metabolism on Difficult Biodegradable Organic Matter", Journal of Jilin Institute of Architecture & Civil Engineering, vol. No. 28, Issue No. 2, pp. 26-28, Apr. 2011.
"Research of Cosubstractes regulate the metabolic pathway of neonicotinoid insecticide imidacloprid and by Stenotrophomonas maltophilia R551-3 strain R551-3 strain", Nanjing normal university Master Thesis, 137 pages, 2012.
PCT Search Report and Written Opinion issued in connection with related PCT Application No. PCT/CN2012/081177 dated Jun. 13, 2013.
Chile office action issued in connection with related CL Application No. 0481-15 dated Feb. 27, 2015.
PCT International Preliminary Report on Patentability issued in connection with related PCT Application No. PCT/CN2012/081177 dated Mar. 10, 2015.
Chinese Office Action issued in connection with related CN Application No. 201280075729.4 dated Nov. 23, 2015.
Chinese Office Action issued in connection with related CN Application No. 201280075729.4 dated Apr. 22, 2016.
Chinese office action issued in connection with related CN Application No. 201280075729.4 dated Aug. 29, 2016.
U.S. Non-Final Office Action issued in connection with related U.S. Appl. No. 14/424,162 dated Apr. 6, 2017.

* cited by examiner

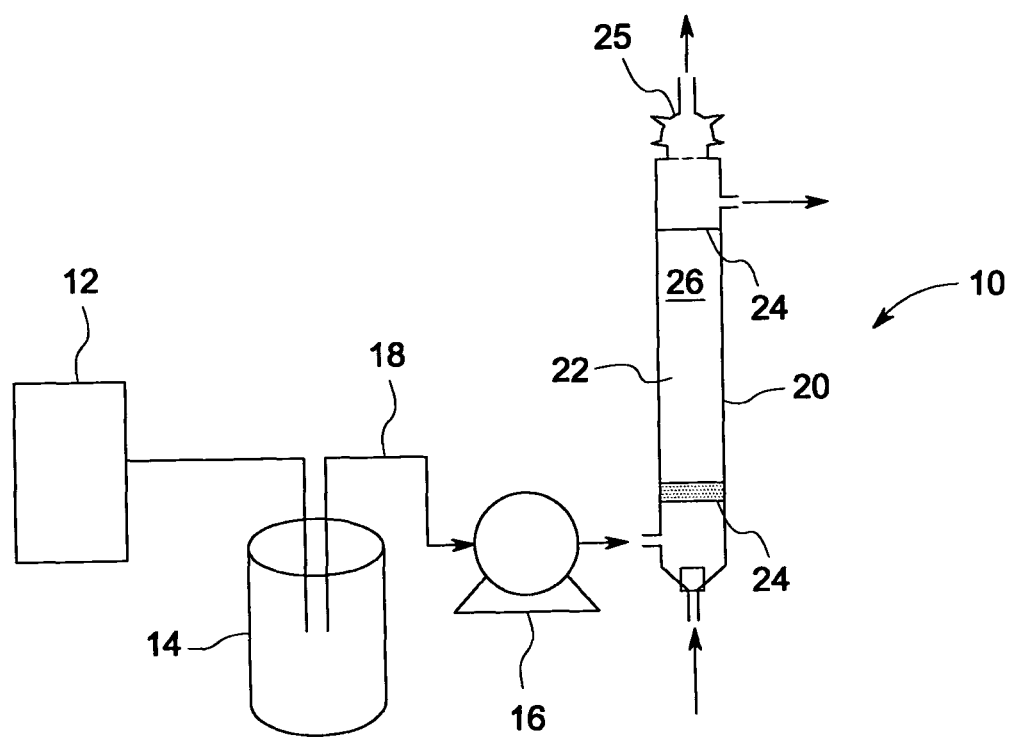

METHOD OF REMOVING RECALCITRANT ORGANIC POLLUTANTS

BACKGROUND OF THE INVENTION

Field of the Invention

The invention relates to a process and system for reduction of chemical oxygen demand, herein referred to as COD, and more particularly to a process and system that immobilizes select microorganisms in a stable biofilm on an adsorbent medium, such as on a granular activated carbon carrier filled in a reactor.

Description of Related Art

Wastewater from an industry may be organic or inorganic in nature or a combination of both. In most cases, it contains toxic ingredients, which can pose a direct threat to human being and animals. Another direct effect of wastewater pollution is to deplete, through the excessive organic load, the dissolved oxygen (DO) content of receiving waters to the point that the stream becomes incapable of exercising the self-purification processes. The deoxygenation may be high enough to practically destroy all fish and other aquatic life. The problem is compounded by the fact that solubility of oxygen in water is very low, less than 12 mg/l. This oxygen comes from two sources, viz. diffusion from the atmosphere at the air/water interface and as a by-product of photosynthesis. Photosynthetic organisms, such as plants and algae, produce oxygen when there is a sufficient light source. During times of insufficient light, these same organisms consume oxygen, resulting in the depletion of DO levels.

Biochemical Oxygen Demand (BOD) and Chemical Oxygen Demand (COD) are indices of the biologically degradable and chemically oxidizable fractions of the wastewater, respectively. COD of the treated effluent is representative of the effectiveness of a treatment technique in its ability to remove the total organic material present in the influent. These parameters are frequently used to define influent and effluent characteristics and also ensure the wastewater treatment efficiency.

Recalcitrant COD refers to organic compounds that resist microbial degradation (bio-refractory) or are not readily biodegradable. Existing biological treatment technologies including the activated sludge process, biological filtration or membrane bioreactors (MBR) cannot efficiently remove these recalcitrant COD compounds. Adsorption and oxidation may be able to remove or destruct these organic compounds, but the cost is often very high. It is accordingly desired to improve methods of removing recalcitrant organic pollutants.

SUMMARY OF THE INVENTION

In one exemplary aspect of the invention, a method is provided for reducing the recalcitrant chemical oxygen demand (COD) of a liquid in a water system. The target water to be treated in this invention has been treated sufficiently in prior steps such as the primary and secondary treatment processes in a typical conventional wastewater treatment plant to remove readily biodegradable organic compounds such that the $BOD_5$/COD ratio is lower than 0.2, desirably lower than 0.1. The method includes further pretreating the liquid in a pretreatment unit to remove indigenous bacteria or microbes to a population level below which the indigenous organisms can interfere with the efficient biodegradation of the recalcitrant COD by the externally introduced bacteria or microbes in the subsequent treatment unit. The liquid is then provided to a reactor that has a filter bed formed with a carrier material. Highly efficient microorganisms or microbial consortium are screened and used to colonize the carrier material to remove recalcitrant COD. A biofilm is cultured on the surface of the carrier material to immobilize the screened microbes in the reactor. The method further includes percolating the liquid from the pretreatment unit through the filter bed colonized with the screened microbes to degrade at least part of the recalcitrant COD under aerobic conditions. In one embodiment, the filter is formed with biological granular activated carbon (GAC) as the carrier material and the screened microbes comprise at least one microbial species selected from the group consisting of *Bacillus, Comamonas, Arthrobacter, Micrococcus, Pseudomonas, Pediococcus, Achromobacter, Flavobacterium, Mycobacterium, Rhodanobacter, Stenotrophomonas* and yeast.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 illustrates a schematic view of a water treatment system for reducing recalcitrant organic pollutants according to an embodiment of the invention.

Corresponding reference characters indicate corresponding parts throughout the views of the drawing.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

FIG. 1 shows a water treatment system 10 for removal of residual pollutants in a treated wastewater. Desirably, the target water to be treated in system 10 has been fully treated in prior steps by a biological process to remove the readily biodegradable pollutants such that its effluent $BOD_5$ is less than 30 ppm, more desirably less than 10 ppm, or even less than 5 ppm. The major residual pollutants targeted by the water treatment system 10 are recalcitrant COD that remain after conventional primary and secondary wastewater treatment and membrane based water treatment (e.g., MF/UF, MBR). Recalcitrant COD refers to organic compounds that resist microbial degradation (bio-refractory) or are not readily biodegradable. The water treatment system 10 treats a polluted aqueous liquid which contains recalcitrant COD in order to decompose at least a portion of these compounds to lower the COD value of the liquid. The water treatment system 10 may also be used for removal of recalcitrant COD in other water bodies, such as surface water and ground water.

The liquid stream to be treated is initially pretreated in a pretreatment unit 12. The pretreatment unit 12 removes indigenous bacteria or microbes to a population level below which the indigenous organisms can interfere with the screened and externally introduced microorganisms in reactor 20. In one embodiment, the pretreatment unit is a filtration unit where MF or UF membrane or media filtration is employed. In another embodiment, the pretreatment unit 12 is combined with prior steps for simultaneous biological treatment and membrane filtration such as in MBR. As desired pretreatment units 12 are well known to those skilled in the art, further discussion of the pretreatment unit 12 need not be included herein.

The liquid to be treated is sent from the pretreatment unit 12 to a feed tank 14. The feed tank 14 is desirably provided with an agitator driven by a motor. By means of a pump 16 arranged in conduit 18, the liquid to be treated is pumped at a predetermined flow rate to a reactor 20 containing a packed filter bed 22. In one embodiment, the liquid to be treated is pumped from the feed tank 14 using a pump 16 at a substantially constant flow rate to the bottom of the reactor 20 for continuous treatment. Alternately, a diffuser (not shown) on bottom of the filter bed 22 may distribute the liquid to be treated over the filter bed 22. As is known in the art, the diffuser may be composed of a large number of small tube sections. One skilled in the art will understand that other means for feeding the liquid to be treated to the reactor 20 may also be used without departing from the scope of the invention. For example, it is also possible to distribute the liquid by spraying over the top of the filter bed 22. On the ends of the filter bed 22, a course filter layer 24 of plastic matrices or a screen may be arranged in the reactor 20 so that particles of the filter bed 22 are kept in the reactor 20 without hampering the passage of the percolate flowing out of the filter bed 22. The reactor may be vented through vent 25.

The filter bed 22 is desirably formed with biological granular activated carbon (GAC) as a carrier material 26. A biofilm is formed on the surface of the carrier material 26 by employing microbial culturing techniques. The carrier material 26 desirably is an adsorbent for at least part of the organic compounds in the water to be treated so that these compounds are withdrawn from the water and concentrated on the surfaces of the carrier material 26. In this way, these compounds can more efficiently be decomposed by microbes colonizing the carrier material 26. Other carrier materials 26 which are able to adsorb dissolved organic compounds and which can be used in the process are activated carbon containing materials, lignite, zeolites, and synthetic adsorbent materials.

According to one aspect of the invention, highly efficient microbes and enzymes, hereinafter the screened microbes are used to colonize the carrier material 26 and biodegrade the recalcitrant COD. The selected microbes and enzymes (or their mixtures) are immobilized by the carrier material 26 within the reactor 20. It has been found that indigenous bacteria greatly reduce the efficiency of the screened bacteria, as the screened bacteria are not dominant, and the screened bacteria cannot effectively compete and maintain its desired function in the presence of the indigenous bacteria. Accordingly, the native bacterial species are substantially removed or minimized in the pretreatment unit 12 to reduce contamination of the seeded biofilm. In order to enable the screened bacteria to break down the non-biodegradable organic compounds, the $BOD_5/COD$ ratio of the water to be treated should be sufficiently low, lower than 0.2, or desirably even lower than 0.1, in order to avoid competition with other bacteria which decompose biodegradable organic compounds and which can thus grow or develop much quicker than the screened bacteria.

Screening highly efficient microorganisms and/or bioaugmentation products which are good at removing the target pollutants (e.g., recalcitrant COD) may involve a variety of techniques including microbial screening, microbial isolation such as from the sites or water bodies polluted with the target recalcitrant organic compounds, microbial culturing, and assessment of biodegradation efficiency for removal of the target recalcitrant pollutants. The present invention can be practiced using bacteria or microbes that can efficiently degrade the target recalcitrant organic compounds. This invention, however, is not limited to specific microbes, or to any one method of obtaining or preparing these microbes. The commercially available microbes and bioaugmentation products that show capability of efficiently biodegrading the target recalcitrant organic compounds can be used in the scope of the present invention.

In one embodiment, a screened microorganism mixture comprises at least one microbial species selected from the group consisting of *Bacillus, Comamonas, Arthrobacter, Micrococcus, Pseudomonas, Pediococcus, Achromobacter, Flavobacterium, Mycobacterium, Rhodanobacter, Stenotrophomonas* and yeast. In another embodiment, screened pure microbes or the mixture of the screened pure microbial strains are used as inoculum to seed the reactor to form biofilm. These screened microbes are so-called specialist microbes which grow or develop usually slower than the bacteria in conventional activated sludge water purification installations for the biological treatment of domestic wastewater.

A dense and stable biofilm is formed on the surface carrier material 26 by employing microbial culturing techniques. Desirably the liquid used for the microbial culturing is from the target pollutant water to be treated containing target recalcitrant organic compounds. This will help the externally introduced microorganisms to be simultaneously acclimated to the water to be treated. Additional nutrients may be added to facilitate microbial growth and formation of the biofilm on the carrier materials. The additional nutrients may include carbon sources, nitrogen sources, phosphorous sources and mineral elements required for microbial growth and biofilm formation. Desirably, air sparging or other methods of oxygenation are provided to the reactor 20 for biofilm growth, maintenance and for biodegradation of the target pollutants. In the process according to the invention, the polluted water is percolated through a packed filter bed 22 of a carrier material 26 which is colonized with microbes which enable to degrade at least part of the non-biodegradable organic compounds under aerobic conditions. The recalcitrant COD containing water stream passes through the reactor 20 for a retention period. With combination of adsorption by the carrier material 26 and biodegradation, recalcitrant COD is removed. As the selected microbes/enzymes are immobilized as biofilm and are not mixed with large amount of indigenous microorganisms, they can maintain their super catabolic capabilities on the recalcitrant COD over a long time. By combining adsorption by GAC and biodegradation by selected screened microorganisms, the reactor 20 provides efficient removal of recalcitrant COD.

Cometabolism may be employed to enhance removal of the recalcitrant COD in this invention. Biodegradable organic compounds can be grouped into two categories according to whether energy is directly available to the microorganism for cell growth and maintenance during their biotransformation. Organics whereby the bio-oxidation of which provide energy and carbon directly for cell growth and maintenance are categorized as growth substrates. In this case, cells grow by consuming the growth substrates. On the other hand, the biotransformation of non-growth substrates (the other category) supplies no or negligible direct energy for cell synthesis and maintenance. Consequently, cell growth is impossible or negligible when the non-growth substrates are the only organic compounds available, even when other essential growth nutrients are present. Biotransformation of a non-growth substrate without nutrimental benefit in the presence of a growth substrate is called cometabolism.

Many organic compounds of environmental and toxicological significance can be transformed through cometabolism, and it can be employed in this invention to enhance removal of recalcitrant COD. Products of growth-associated biodegradation are $CO_2$, $H_2O$, and cell biomass. Besides supporting cell growth, growth substrates also serve to induce the enzymes and cofactors required for cometabolism. The enzymes involved in cometabolic reactions usually act on a series of closely related molecules, and are not absolutely specific for a single substrate. Some even catalyze a single type of reaction on a variety of structurally dissimilar molecules. The non-growth substrate is not assimilated in cometabolism, but the cometabolically transformed product can be a growth substrate for other organisms in a mixed culture.

Specific organic compounds may be dosed to induce the enzymes and cofactors for cometabolism to speed up the recalcitrant COD removal. The dosed organic compounds also serve to grow microbes and maintain a good biofilm formation on the surface of the carrier material. Depending on the compositions of the recalcitrant COD and the microbial populations, a wide range of organic compound can be selected, including but not limited to alkane or alkene containing 1-10 carbons, aromatic petroleum hydrocarbon, aliphatic hydrocarbon, phenolic compounds, and carbohydrate compounds and derivatives of these organic compounds. Dosing such specific organic compounds into the reactor should not be in an excessive amount so that it can be fully consumed in the reactor.

In one embodiment, phenol is added to the liquid to be treated for removal of recalcitrant COD which mainly contains phenolic compounds, conjugated aromatic hydrocarbons or heteroaromatic-conjugated hydrocarbons, such as often seen in coke plant wastewater treatment effluent. In one embodiment, phenol can be dosed directly into the feed tank 14 to be mixed well with the influent water to be treated. In one embodiment, the dosed phenol concentration in the feed tank is less than 100 mg/L, desirably less than 50 mg/L. Besides to support microbial growth, it is postulated that phenol can induce enzymes such as monooxyenase and dioxygenase which also help for cometabolic transformation of other recalcitrant organic compounds.

The above process mainly targets at removing residual recalcitrant organic contaminants that still remain untreated after a normal biological wastewater treatment such as activated sludge process or MBR system. The selected microorganisms are more capable and more efficient in biodegradation of the residual organic pollutants compared to the indigenous microorganisms in the water streams or in the activated sludge. In contrast to a normal bioaugmentation where a group of non-native microorganisms are dosed to an existing biological wastewater treatment process and mixed with the native microorganisms, in this invention the selected microorganisms are immobilized in carriers such as granular activated carbon (GAC). The immobilized microorganisms will not only have stronger acclimation to the new conditions and higher toxicity tolerance, they also can maintain their specific metabolic capability of biodegrading the target recalcitrant pollutants over a long time.

EXAMPLES

The invention will now be further described with reference to the following examples which are to be regarded solely as illustrative and not as restricting the scope of the invention.

Example 1

A pretreatment unit 12 having an MBR system comprising anoxic tank, aerobic tank and membrane tank was used for treatment of refinery wastewater. The feed wastewater was a synthetic refinery wastewater which contained 80 mg/L emulsified oil prepared from a crude oil, 100 mg/L phenol, other types of carbon, nitrogen, phosphate and mineral elements. The total COD, ammonia nitrogen and total nitrogen of the feed wastewater were in the ranges of 1000-2000 mg/L, 20-70 mg/L and 80-130 mg/L, respectively. A ZW500D hollow fiber membrane available from General Electric was used. Stable and efficient treatment was achieved. The MBR effluent COD, ammonia nitrogen and total nitrogen were in the ranges of 30-90 mg/L, 0-2 mg/L and 7-52 mg/L, respectively. Part of the MBR effluent was collected in a storage tank for use as the influent water for the wastewater treatment system 10. The MBR effluent $BOD_5$ was always found to be less than 5 mg/L during the whole testing period.

A glass column reactor 20 filled with 40 g granular activated carbon (GAC) was set up. The column inner diameter was 25 mm, the static GAC bed height was 340 mm and the working liquid volume in the GAC-filled column reactor 20 was 70 ml. Deionized water was used to flush and clean the GAC at 8 ml/min for 24 hrs before both the influent and effluent valves were closed for nutrient loading and microbial culturing. 3.0 g Oxoid® Tryptone Soya Broth and the influent water to be treated were added to the column with air sparging to mix the nutrients and GAC. A screened microorganism mixture comprising *Bacillus, Comamonas, Rhodanobacter* and *Stenotrophomonas* was used for inoculation. After 72 hours, another 1.0 g Oxoid® Tryptone Soya Broth was supplemented to the column. Sampling at 140 hr to do plate counting showed that planktonic microorganisms were more than $3 \times 10^8$ cfu/ml. Air sparging was kept at 100 ml/min during the microorganism culturing for biofilm formation and the subsequent biodegradation treatment. After the microbial culturing for 140 hr, a stable and dense biofilm was formed on the GAC surface. Then both the influent and effluent valves were opened and the influent water from the storage tank was pumped by a peristaltic pump at a constant flow rate of 0.6 ml/min to the column from its bottom for continuous treatment.

The treatment results are shown in Table 1. The influent water came from the MBR effluent with sufficient biological treatment and membrane filtration. The $BOD_5$ of the influent water entering into the glass column reactor was found to be less than 3 mg/L. The treatment testing had been conducted for four months stably. The average COD of the influent water was 55 mg/L but varied in the range of 30 mg/L-90 mg/L. Although the influent water mainly contained recalcitrant or bio-refractory COD after sufficient MBR treatment, the GAC-Biofilm reactor stably reduced the COD of the water to an average less than 30 mg/L with variation between 16 mg/L to 44 mg/L.

TABLE 1

Treatment of the MBR effluent on COD removal

| Week | 1 | 2 | 3 | 4 | 5 | 6 | 7 | 8 | 9 | 10 | 11 | 12 | 13 | 14 | 15 | 16 | 17 | Average |
|---|---|---|---|---|---|---|---|---|---|---|---|---|---|---|---|---|---|---|
| Influent COD (mg/L) | 67 | 65 | 65 | 65 | 69 | 69 | 90 | 81 | 46 | 40 | 33 | 37 | 30 | 39 | 52 | 47 | 44 | 55.2 |
| Effluent COD (mg/L) | 26 | 28 | 30 | 31 | 35 | 44 | 41 | 38 | 25 | 21 | 17 | 20 | 16 | 25 | 36 | 29 | 27 | 28.8 |
| Removal Rate (%) | 61 | 57 | 54 | 52 | 49 | 36 | 54 | 53 | 46 | 48 | 48 | 46 | 47 | 36 | 31 | 38 | 39 | 47.8 |

During the test, assessment of the biofilm on the GAC surface was also conducted by sampling about 0.1 g GAC from the column reactor. It was then mixed with de-ionized water in a sterile sampling bottle and weighed. Attached microorganisms (as biofilm) on the surface of the GAC particles were peeled off by sonication for 30 minutes. Plate counting was conducted for the suspended microorganisms in the liquid in the sampling bottle before sonication and after sonication, respectively. The bacterial density was found to be in the order of $10^8$ cfu/gGAC in the first ten weeks. However as the influent COD was pretty low after week 10, mostly in the range of 30-40 mg/L, it was found in week 17 that the bacterial density dropped to the order of $10^7$ cfu/gGAC, which also explained the lower COD removal rate in the later weeks.

In another test, it was found that the recalcitrant COD removal efficiency was not affected if the influent water flow rate was doubled from 0.6 ml/min to 1.2 ml/min. This result shows that the system design and operational parameters can be optimized to further improve the treatment efficiency of the reactor.

Example 2

The method of this invention was also applied to assess the efficiency of the recalcitrant COD removal for a coke plant wastewater treatment effluent. The coke plant wastewater was treated on-site in a wastewater treatment plant (WWTP) of a steel mill company through conventional activated sludge process (anaerobic-anoxic-aerobic), coagulation and clarification. The water sample taken from this WWTP effluent was further treated by coagulation and clay filtration in our lab to remove suspended solids and indigenous microbes.

In order to understand the residual organic compound compositions, the water sample was extracted with dichloromethane (DCM) to remove and concentrate organics from the water. This extract was analyzed by GC/MS. A series of linear hydrocarbons ranging from C17 to C25, naphthalene, naphthanol, methyl thiobenzene, phenyl methyl sulfone, dimethyl naphthyridine, p-cyclopentyl phenol, benzopyrrolizidine, trimethyl indole carboxylate, methyl phenyl benzimidazole, anthracene, and methyl anthracene, phenanthrene and methyl, dimethyl and trimethyl phenanthrene, azafluorenone, azapyrene, methoxy iminopyridio carbazole, hydroxyl phenazine, and dioctyl phthalate were identified. These results suggest that the majority of the extracted compounds were conjugated aromatic hydrocarbons ranging from naphthalene (two fused benzene rings) to pyrene (four fused benzene rings) with varying degrees of methyl substituents and heteroaromatic-conjugated hydrocarbons containing predominantly nitrogen and oxygen heteroatoms.

Similar to the setup described in Example 1, a same size glass column reactor 20 filled with 40 g granular activated carbon (GAC) was set up. De-ionized water was used to flush and clean the GAC at 8 ml/min for 24 hours before both the influent and effluent valves were closed for nutrient loading and microbial culturing. The similar procedures for microbial inoculation and microbial culturing were used for biofilm formation. However, different to the microorganisms used in Example 1, a separately screened microorganism mixture was identified to specifically target at the recalcitrant COD of the coke plant wastewater treatment effluent. The screened microorganism mixture comprising *Bacillus*, *Comamonas*, and *Rhodanobacter* was used for microbial inoculums. After the microbial culturing for 140 hr, a stable and dense biofilm was formed on the GAC surface. Then both the influent and effluent valves were opened and the influent water from the storage tank was pumped by a peristaltic pump at a constant flow rate of 0.6 ml/min to the column from its bottom for continuous treatment.

The test was conducted for five months. In the first two months, the influent water to be treated was dosed with 10 ppm phenol in the feed tank 14. Phenol was added to serve two purposes: support microbial growth and induce enzymes for cometabolic transformation of the recalcitrant organic compounds. The treatment result is shown in Table 2.

TABLE 2

Treatment of the Coke Plant Wastewater Treatment Plant effluent on COD removal (with 10 ppm phenol addition)

| Time (day) | 1 | 3 | 8 | 12 | 18 | 26 | 32 | 37 | 41 | 43 | 52 | 57 | Average |
|---|---|---|---|---|---|---|---|---|---|---|---|---|---|
| Influent COD (mg/L) | 149 | 149 | 157 | 157 | 179 | 181 | 111 | 138 | 127 | 120 | 133 | 138 | 145 |
| Effluent COD (mg/L) | 121 | 120 | 123 | 122 | 128 | 116 | 70 | 89 | 85 | 85 | 87 | 87 | 103 |
| Removal Rate (%) | 19 | 19 | 22 | 22 | 28 | 36 | 37 | 36 | 33 | 29 | 35 | 37 | 29.0 |

As shown in Table 2, the COD removal rate (excluded contribution of phenol removal in calculation of the COD removal rate) was gradually improved in the first 2-3 weeks probably due to the fact that the microbes needed to be acclimated to this type of water containing some very recalcitrant, inhibitory and even toxic organic compounds.

During sampling days between 26th and 57th, the COD removal rate was increased with an average COD removal rate of about 35%.

Phenol addition was stopped on 60th day. The treatment result for the next three months testing is shown in Table 3.

TABLE 3

Treatment of the Coke Plant Wastewater Treatment Plant effluent on COD removal (without phenol addition)

| Time (day) | 62 | 68 | 69 | 72 | 84 | 87 | 94 | 114 | 121 | 127 | 141 | 147 | Average |
|---|---|---|---|---|---|---|---|---|---|---|---|---|---|
| Influent COD (mg/L) | 129 | 135 | 145 | 132 | 171 | 182 | 170 | 143 | 133 | 198 | 144 | 108 | 149 |
| Effluent COD (mg/L) | 90 | 117 | 129 | 98 | 129 | 157 | 143 | 100 | 100 | 178 | 129 | 97 | 122 |
| Removal Rate (%) | 30 | 13 | 11 | 26 | 25 | 14 | 16 | 30 | 25 | 10 | 10 | 10 | 18.1 |

It was found that the COD removal rate was reduced by stopping the phenol dosing into the influent water. The COD removal rate was reduced to about 10% in the last three sampling days. Sampling GAC particles for biofilm assessment also revealed that the biofilm density was decreased in the later stage during the test time period, which also explained the reduced COD removal rate. Phenol addition in the first 60 days not only supported microbial growth to maintain a stable and dense biofilm on the surface of the GAC particles, it also helped induce activation or production of enzymes required for cometabolic removal of the recalcitrant organic compounds in the feed water.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claim is:

1. A method for reducing the recalcitrant chemical oxygen demand (COD) of a liquid in a water system, the method comprising the steps of:
    providing a reactor having a filter bed with carrier material disposed therein;
    screening microbes that can remove recalcitrant COD and colonizing said carrier material with said screened microbes, wherein the screened microbes comprise externally introduced microbes;
    culturing a dense biofilm on the carrier material surface to immobilize said screened microbes in said filter bed;
    pretreating said liquid in a pretreatment unit to reduce the amount of indigenous bacteria or microbes in said liquid to a population level below which said indigenous bacteria or microbes will interfere with said screened microbes that have been colonized on said carrier material;
    percolating the liquid from said pretreatment unit through said filter bed colonized with said screened microbes for a retention time sufficient to degrade at least a portion of said recalcitrant COD under aerobic conditions; and
    dosing a growth substrate comprising phenolic compounds and derivatives thereof on the surface of the carrier material to activate and produce enzymes to maintain biofilm formation and induce cometabolism with the screened microbes thereby enhancing the removal of the recalcitrant COD by at least about 35%, wherein a concentration of the growth substrate in the percolated liquid is less than about 50 mg/L such that the growth substrate is fully consumed in the reactor during removal of said recalcitrant COD.

2. The method of claim 1 wherein the liquid to be treated has been sufficiently treated in prior steps so that a ratio of a 5-day biochemical oxygen demand ($BOD_5$) to the COD of the liquid is less than 0.2.

3. The method of claim 1 wherein the liquid to be treated has been sufficiently treated in prior steps so that a 5-day biochemical oxygen demand ($BOD_5$) of the liquid is less than 30 mg/L.

4. The method of claim 1 wherein the carrier material filled in the reactor is of any type of carriers that can be used for microbial immobilization to form a biofilm and effectively adsorb at least part of the recalcitrant COD of the liquid.

5. The method of claim 4 wherein the carrier material filled in the reactor is a member chosen from the group consisting of activated carbon containing materials, lignite, zeolites, and synthetic adsorbent materials.

6. The method of claim 4 wherein the carrier material filled in the reactor is a granular activated carbon (GAC).

7. The method of claim 1 wherein the screened microbes comprise at least one microbial species selected from the group consisting of *Bacillus, Comamonas, Arthrobacter, Micrococcus, Pseudomonas, Pediococcus, Achromobacter, Flavobacterium, Mycobacterium, Rhodanobacter, Stenotrophomonas* and yeast.

8. The method of claim 1 wherein the liquid to be treated is treated in prior steps comprising treating the liquid using processes selected from activated sludge, clarification, membrane bioreactor and filtration.

9. The method of claim 1 wherein air sparging or other means of oxygenation is used to provide oxygen during the culturing step to provide for biofilm formation and for biodegradation of the recalcitrant COD.

10. The method of claim 1 wherein the liquid is percolated through the filter bed for a retention time of less than 10 hours.

11. The method of claim 1 wherein the liquid is percolated through the filter bed for a retention time of less than 5 hours.

* * * * *